US008775481B2

(12) United States Patent
Jalaldeen

(10) Patent No.: US 8,775,481 B2
(45) Date of Patent: Jul. 8, 2014

(54) RE-ESTABLISHING TRACEABILITY

(75) Inventor: Ahamed Jalaldeen, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 13/448,893

(22) Filed: Apr. 17, 2012

(65) Prior Publication Data

US 2012/0203743 A1 Aug. 9, 2012

Related U.S. Application Data

(63) Continuation of application No. 12/335,686, filed on Dec. 16, 2008, now Pat. No. 8,224,869.

(51) Int. Cl.
*G06F 17/30* (2006.01)

(52) U.S. Cl.
USPC .......................................................... 707/803

(58) Field of Classification Search
USPC ................................................ 707/803–808
See application file for complete search history.

(56) References Cited

U.S. PATENT DOCUMENTS

| | | | |
|---|---|---|---|
| 6,779,172 B1 | 8/2004 | Weerawarana et al. | |
| 6,804,682 B1 | 10/2004 | Kemper et al. | |
| 6,826,568 B2 * | 11/2004 | Bernstein et al. | 707/749 |
| 6,865,593 B1 | 3/2005 | Reshef et al. | |
| 7,370,318 B1 | 5/2008 | Howe et al. | |
| 7,373,596 B2 | 5/2008 | Hu et al. | |
| 7,444,330 B2 * | 10/2008 | Bernstein et al. | 1/1 |
| 8,065,608 B2 * | 11/2011 | Raghavachari et al. | 715/237 |
| 8,086,560 B2 * | 12/2011 | Hernandez-Sherrington et al. | 707/601 |
| 8,224,869 B2 | 7/2012 | Jalaldeen | |
| 8,307,012 B2 * | 11/2012 | Thomas | 707/803 |
| 2002/0104068 A1 | 8/2002 | Barrett et al. | |
| 2004/0093381 A1 | 5/2004 | Hodges et al. | |
| 2004/0172442 A1 * | 9/2004 | Ripley | 709/200 |
| 2004/0249645 A1 | 12/2004 | Hauser et al. | |
| 2005/0027681 A1 * | 2/2005 | Bernstein et al. | 707/1 |
| 2005/0060332 A1 * | 3/2005 | Bernstein et al. | 707/100 |
| 2005/0108684 A1 | 5/2005 | Sohn et al. | |

(Continued)

FOREIGN PATENT DOCUMENTS

WO 2005048066 5/2005

OTHER PUBLICATIONS

Amendment filed May 9, 2012 in response to Office Action (Mail Date Feb. 13, 2012) for U.S. Appl. No. 12/328,827, filed Dec. 5, 2008.

(Continued)

*Primary Examiner* — Debbie Le
(74) *Attorney, Agent, or Firm* — Schmeiser, Olsen & Watts; John Pivnichny

(57) ABSTRACT

A traceability link establishing method and system. The method includes retrieving by a computing system, mapping data comprising data associating elements of a source model to elements of a target model. The computing system retrieves the target model and elements of the target model. The computing system processes an element of the elements. The computing system retrieves first traceability links from the element. The computing system processes the traceability links. The computing system retrieves supplier data associated with the traceability links. The supplier data comprises data associated with a first supplier. The computing system verifies if the supplier comprises a valid supplier. The computing system stores results of the verifying process. The results indicate if the supplier comprises a valid supplier.

20 Claims, 7 Drawing Sheets

(56) References Cited

U.S. PATENT DOCUMENTS

| | | |
|---|---|---|
| 2005/0137836 A1 | 6/2005 | Clark et al. |
| 2005/0144226 A1 | 6/2005 | Purewal |
| 2005/0262188 A1 | 11/2005 | Mamou et al. |
| 2006/0026506 A1 | 2/2006 | Kristiansen et al. |
| 2006/0069717 A1 | 3/2006 | Mamou et al. |
| 2006/0156277 A1 | 7/2006 | Gupta et al. |
| 2006/0167665 A1 | 7/2006 | Abu El Ata |
| 2006/0242195 A1 | 10/2006 | Bove et al. |
| 2007/0203740 A1 | 8/2007 | Abu El Ata et al. |
| 2007/0203931 A1* | 8/2007 | Ukelson et al. ............... 707/101 |
| 2007/0204007 A1 | 8/2007 | Ashaari et al. |
| 2008/0004927 A1 | 1/2008 | Haller et al. |
| 2008/0021753 A1 | 1/2008 | Cummins |
| 2008/0022257 A1 | 1/2008 | Baartman et al. |
| 2008/0028084 A1 | 1/2008 | Bloching et al. |
| 2008/0028365 A1 | 1/2008 | Erl |
| 2008/0052664 A1 | 2/2008 | Batabyal |
| 2008/0065466 A1 | 3/2008 | Liu et al. |
| 2008/0091513 A1 | 4/2008 | Waggoner |
| 2008/0127047 A1 | 5/2008 | Zhang et al. |
| 2008/0155397 A1 | 6/2008 | Bissonnette et al. |
| 2008/0172574 A1 | 7/2008 | Fisher |
| 2008/0177887 A1 | 7/2008 | Theilmann |
| 2008/0183850 A1 | 7/2008 | Basu et al. |
| 2008/0256124 A1* | 10/2008 | Hernandez-Sherrington et al. .................... 707/103 R |
| 2008/0282219 A1 | 11/2008 | Seetharaman et al. |
| 2009/0024561 A1 | 1/2009 | Palanisamy |
| 2009/0049025 A1 | 2/2009 | Fay et al. |
| 2009/0049040 A1 | 2/2009 | Fay et al. |
| 2009/0064205 A1 | 3/2009 | Fay et al. |
| 2009/0112668 A1 | 4/2009 | Abu El Ata |
| 2009/0182750 A1 | 7/2009 | Keyes et al. |
| 2010/0017783 A1 | 1/2010 | Brininstool et al. |
| 2010/0030890 A1 | 2/2010 | Dutta et al. |
| 2010/0037201 A1 | 2/2010 | Salle et al. |
| 2010/0146479 A1 | 6/2010 | Arsanjani et al. |
| 2010/0153464 A1 | 6/2010 | Jalaldeen |
| 2010/0153914 A1 | 6/2010 | Arsanjani et al. |

OTHER PUBLICATIONS

Final Office Action (Mail Date May 16, 2012) for U.S. Appl. No. 12/328,827, filed Dec. 5, 2008.

Portier; SOA Terminology Overview, Part 1: Service, Architecture, Governance, and Business Terms; IBM Developer Works (Nov. 15, 2006); retrieved from http://www.ibm.com/developerworks/webservices/library/ws-soa-term1/ on May 12, 2012; 13 pages.

ROA; Using UML Service Components to Represent the SOA Architecture Pattern; IBM Developer Works (Jun. 19, 2007); retrieved from http://www.ibm.com/developerworks/architecture/library/ar-logsoa/ on May 12, 2012; 11 pages.

Amendement and Request for Continued Examination filed Jun. 20, 2012 in response to Office Action (Mail Date Feb. 13, 2012) for U.S. Appl. No. 12/328,827, filed Dec. 5, 2008.

Notice of Allowance (Mail Date Jul. 13, 2012) for U.S. Appl. No. 12/328,827, filed Dec. 5, 2008.

Kavianpour, Mansour; SOA and Large Scale and complex Enterprise Transformation; ICSOC '07 Proceedings of the 5th International Conference on Service-Oriented Computing, 2007, pp. 530-545.

Zhang, et al.; Refactoring Middleware with Aspects; IEEE Transactions on Parallel and Distributed Systems, vol. 14, No. 11; Nov. 2003; pp. 1058-1073.

DiPenta, Massimiliano; Evolution Doctor: a Framework to Control Software System Evolution; Proceedings of the Ninth European Conference on Software Maintenance and Reengineering; Mar. 21-23, 2005; pp. 1-4.

Notice of Allowance (Mail Date Aug. 1, 2012) for U.S. Appl. No. 12/332,504, filed Dec. 11, 2008.

Office Action (Mail Date Feb. 13, 2012) U.S. Appl. No. 12/328,827, filed Dec. 5, 2008.

Falleri et al.; Towards a Traceability Framework for Model Transformations in Kermeta; In ECMDA-TW'06; ECMDA Traceability Workshop, Sintef ICT, Norway; (2006); pp. 31-40.

Vanhooff et al.; Traceability as Input for Model Transformations; European conference on model driven architecture foundations and applications ECMDA 2007 (1007); pp. 37-46.

VanBaelen et al.; Traceability Management Toolset; ITEA-Information Technology for European Advancement; AMRTES model-Based Approach for Real-Time Embedded Systems Development; Sep. 20, 2007; 28 pages.

Office Action (Mail Date Jul. 11, 2011) for U.S. Appl. No. 12/335,686, filed Dec. 16, 2008.

Amendment filed Sep. 21, 2011 in response to Office Action (Mail Date Jul. 11, 2011) for U.S. Appl. No. 12/335,686, filed Dec. 16, 2008.

Notice of Allowance (Mail Date Mar. 9, 2012) for U.S. Appl. No. 12/335,686, filed Dec. 16, 2008.

* cited by examiner

RE-ESTABLISHING TRACEABILITY

This application is a continuation application claiming priority to Ser. No. 12/335,686, filed Dec. 16, 2008.

FIELD

The present invention relates to a method and associated system for re-establishing traceability between unified modeling language (UML) models.

BACKGROUND

Repairing various components of a software system typically comprises an inefficient process with little flexibility. Accordingly, there exists a need in the art to overcome at least some of the deficiencies and limitations described herein above.

SUMMARY

The present invention provides a method comprising:
retrieving, by a computing system, a transformation mapping file comprising mapping data, wherein said mapping data comprises data associating elements of a source model to elements of a target model;
retrieving, by said computing system, said target model;
retrieving, by said computing system, first elements of said target model;
processing, by said computing system, a first element of said first elements;
retrieving, by said computing system, first traceability links from said first element, wherein said first traceability links are associated with said first element;
processing, by said computing system, said first traceability links;
retrieving, by said computing system, first supplier data associated with said first traceability links, wherein said first supplier data comprises data associated with a first supplier;
first verifying, by said computing system, if said first supplier comprises a valid supplier; and
storing, by said computing system, results of said first verifying, wherein said results of said first verifying indicates if said first supplier comprises a valid supplier.

The present invention provides a computing system comprising a processor coupled to a computer-readable memory unit, said memory unit comprising instructions that when executed by the processor implements a traceability link re-establishing method, said method comprising:
retrieving, by said computing system, a transformation mapping file comprising mapping data, wherein said mapping data comprises data associating elements of a source model to elements of a target model;
retrieving, by said computing system, said target model;
retrieving, by said computing system, first elements of said target model;
processing, by said computing system, a first element of said first elements;
retrieving, by said computing system, first traceability links from said first element, wherein said first traceability links are associated with said first element;
processing, by said computing system, said first traceability links;
retrieving, by said computing system, first supplier data associated with said first traceability links, wherein said first supplier data comprises data associated with a first supplier;
first verifying, by said computing system, if said first supplier comprises a valid supplier; and
storing, by said computing system, results of said first verifying, wherein said results of said first verifying indicates if said first supplier comprises a valid supplier.

The present invention provides a computer program product, comprising a computer readable medium comprising a computer readable program code embodied therein, said computer readable program code adapted to implement a traceability link re-establishing method within a computing system comprising a computer-readable memory unit, said method comprising:
retrieving, by said computing system, a transformation mapping file comprising mapping data, wherein said mapping data comprises data associating elements of a source model to elements of a target model;
retrieving, by said computing system, said target model;
retrieving, by said computing system, first elements of said target model;
processing, by said computing system, a first element of said first elements;
retrieving, by said computing system, first traceability links from said first element, wherein said first traceability links are associated with said first element;
processing, by said computing system, said first traceability links;
retrieving, by said computing system, first supplier data associated with said first traceability links, wherein said first supplier data comprises data associated with a first supplier;
first verifying, by said computing system, if said first supplier comprises a valid supplier; and
storing, by said computing system, results of said first verifying, wherein said results of said first verifying indicates if said first supplier comprises a valid supplier.

The present invention advantageously provides a simple method and associated system capable of repairing various components of a software system.

DETAILED DESCRIPTION

Figure 1:
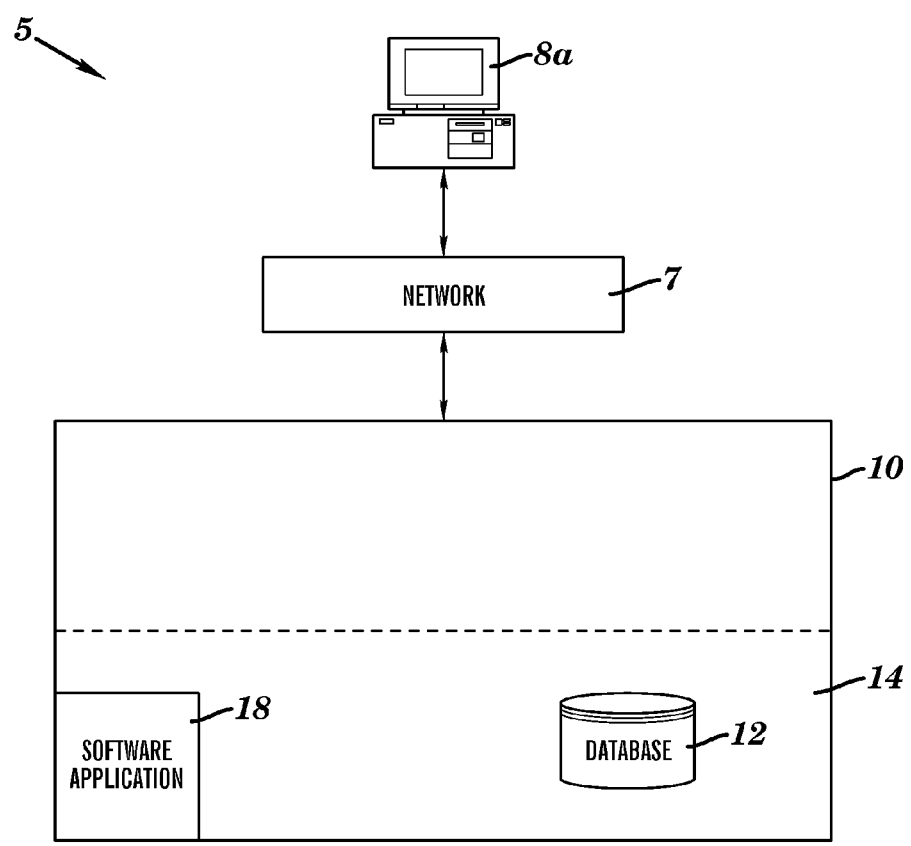
FIG. 1 illustrates a system for re-establishing traceability links between unified modeling language (UML) models, in accordance with embodiments of the present invention.

FIG. 1 illustrates a system 5 for re-establishing traceability links between unified modeling language (UML) models, in accordance with embodiments of the present invention. Traceability links provide relationships between elements of UML models. UML is a standardized general-purpose modeling language in the field of software engineering. UML includes a set of graphical notation techniques to create abstract models of specific systems (i.e., referred to as a UML model). System 5 performs the following functions:
1. Re-establishing traceability links between UML models.
2. Identifying broken traceability links between UML models.
3. Restoring the traceability links between UML models.
4. Implementation of functions 1-3 in UML based modeling tools.

System 5 of FIG. 1 comprises a computing apparatus 8a connected to a computing system 10 through a network 7. Network 7 may comprise any type of network including, inter alia, a local area network, (LAN), a wide area network (WAN), the Internet, etc. Computing apparatus 8a may comprise any type of computing apparatus including, inter alia, a personal computer, a laptop computer, a computer terminal, etc. Computing apparatus 8a may comprise a single computing apparatus or a plurality of computing apparatuses. Computing apparatus 8a is used by end users for communicating with (e.g., entering data) computing system 10. Computing system 10 may comprise any type of computing system(s) including, inter alia, a personal computer (PC), a server computer, a database computer, etc. Computing system 10 is used to retrieve data from computing apparatus 8a for re-establishing traceability links between UML models. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved data (i.e., retrieved from computing apparatus 8a such as, inter alia, traceability links between UML models, mapping files, supplier data, etc) and any generated data (e.g., UML models, etc).

Software application 18 performs the following functions associated with an automated process for re-establishing traceability links between UML models:
1. Software application 18 loads a transformation mapping file from a current service oriented architecture (SOA) project. SOA comprises enterprise scale IT architecture for providing IT agility to support business agility.
2. Software application 18 retrieves model elements from a UML target model.
3. Software application 18 processes every model element in the target model.
4. Software application 18 retrieves all traceability links from a model element.
5. Software application 18 processes every traceability link retrieved from the model element.
6. Software application 18 retrieves a supplier associated with the traceability link.
7. Software application 18 verifies the existence of the supplier.
9. Software application 18 removes the traceability link if the supplier is not found.
10. Software application 18 (i.e., for a current model element of the target model) retrieves a corresponding model element of a source model from a transformation mapping file.
11. Software application 18 creates a traceability link from a target model element to a corresponding source model element.

Figure 3:
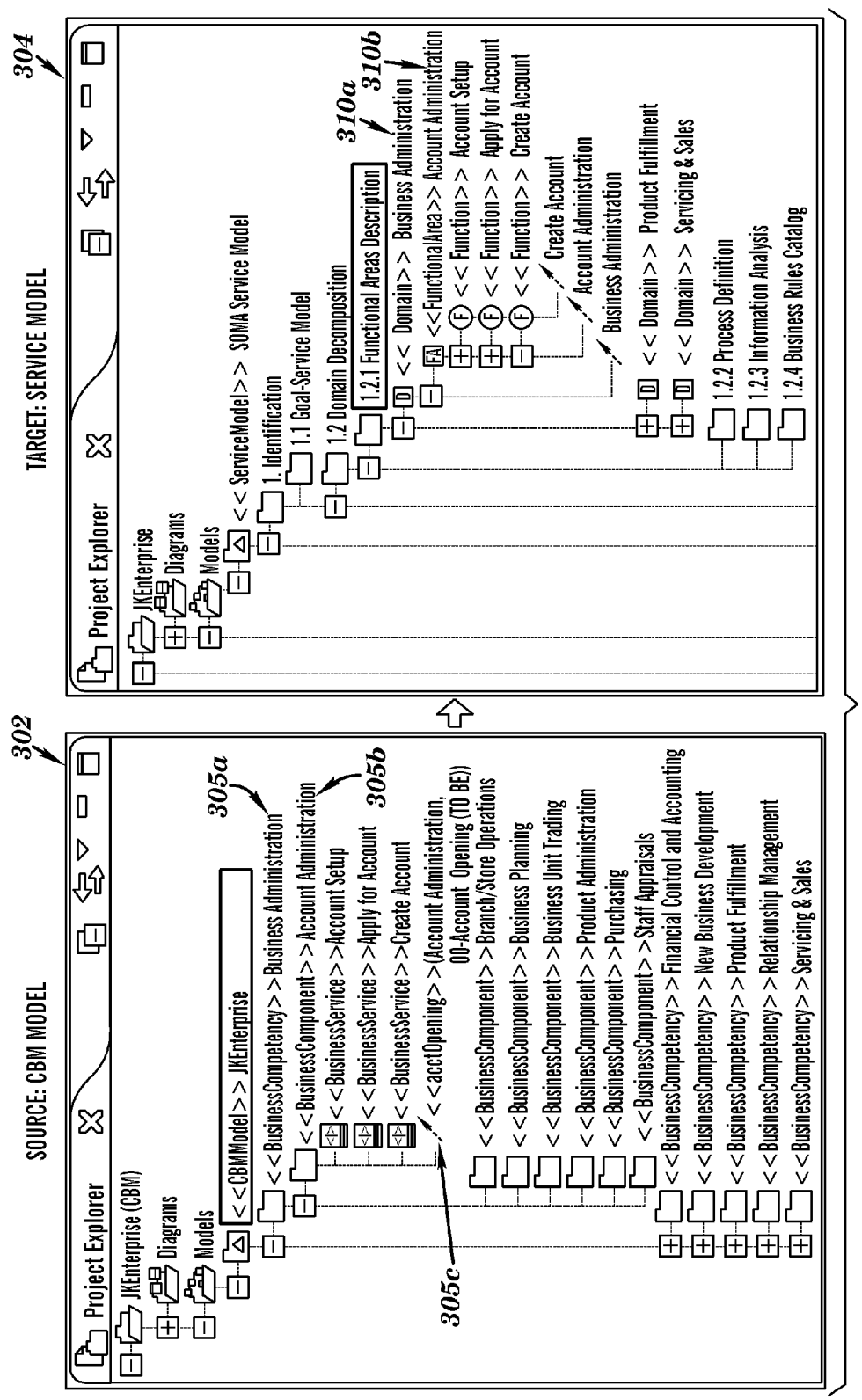
FIG. 3 illustrates a source (CBM) model and a target model, in accordance with embodiments of the present invention.
Figure 4:
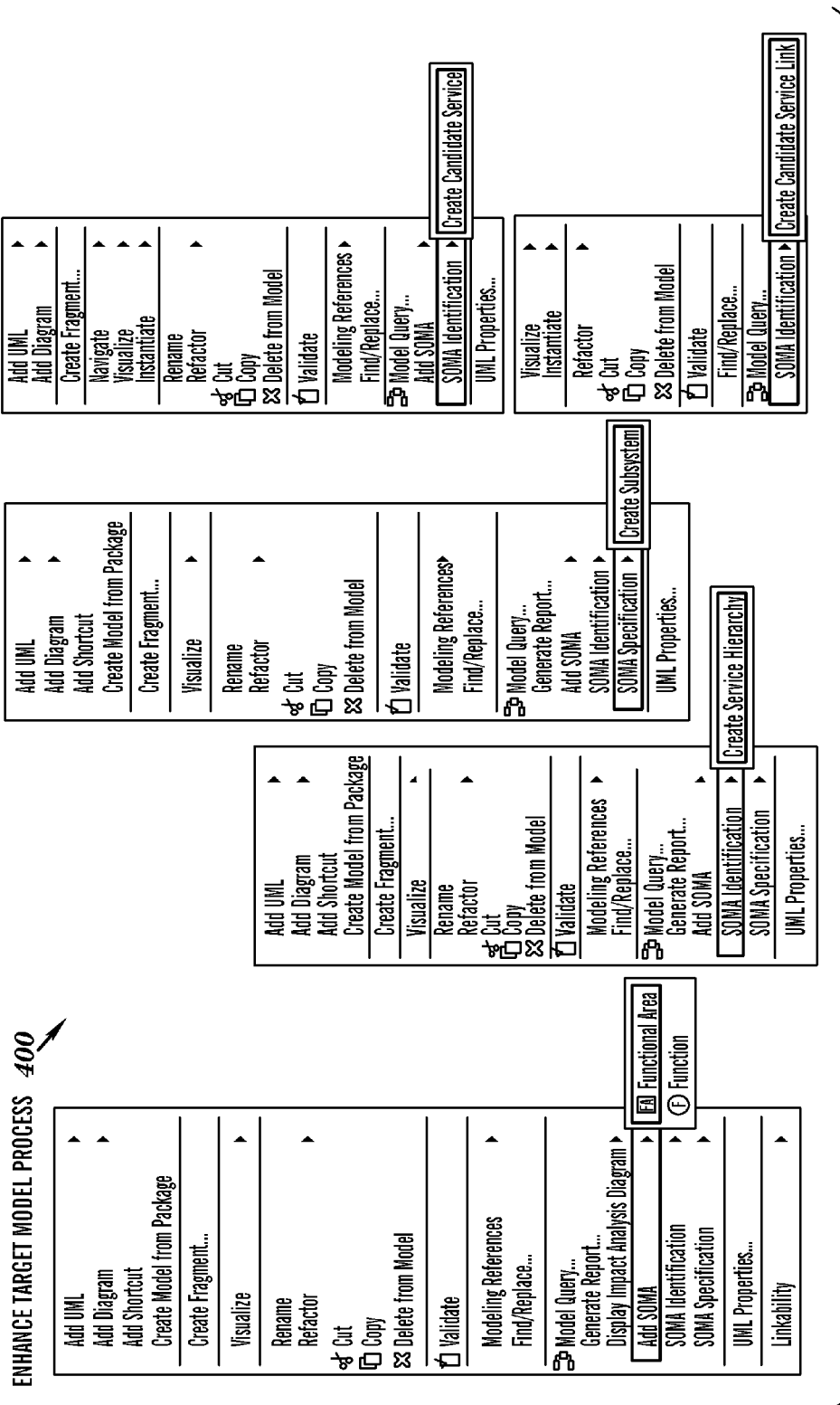
FIG. 4 illustrates an enhanced target model process, in accordance with embodiments of the present invention.
Figure 5:
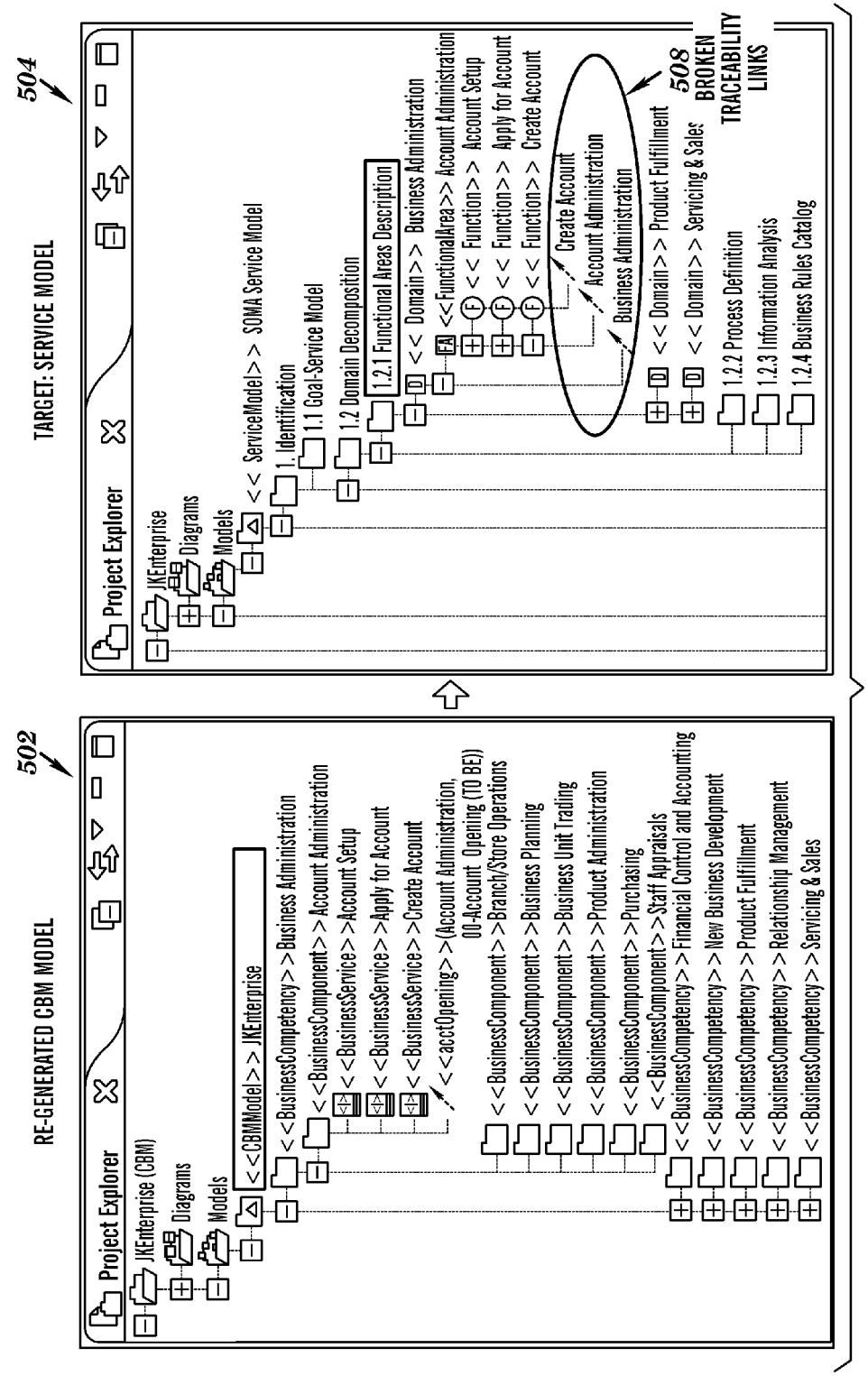
FIG. 5 illustrates a regenerated source (CBM) model and a target model, in accordance with embodiments of the present invention.
Figure 6:
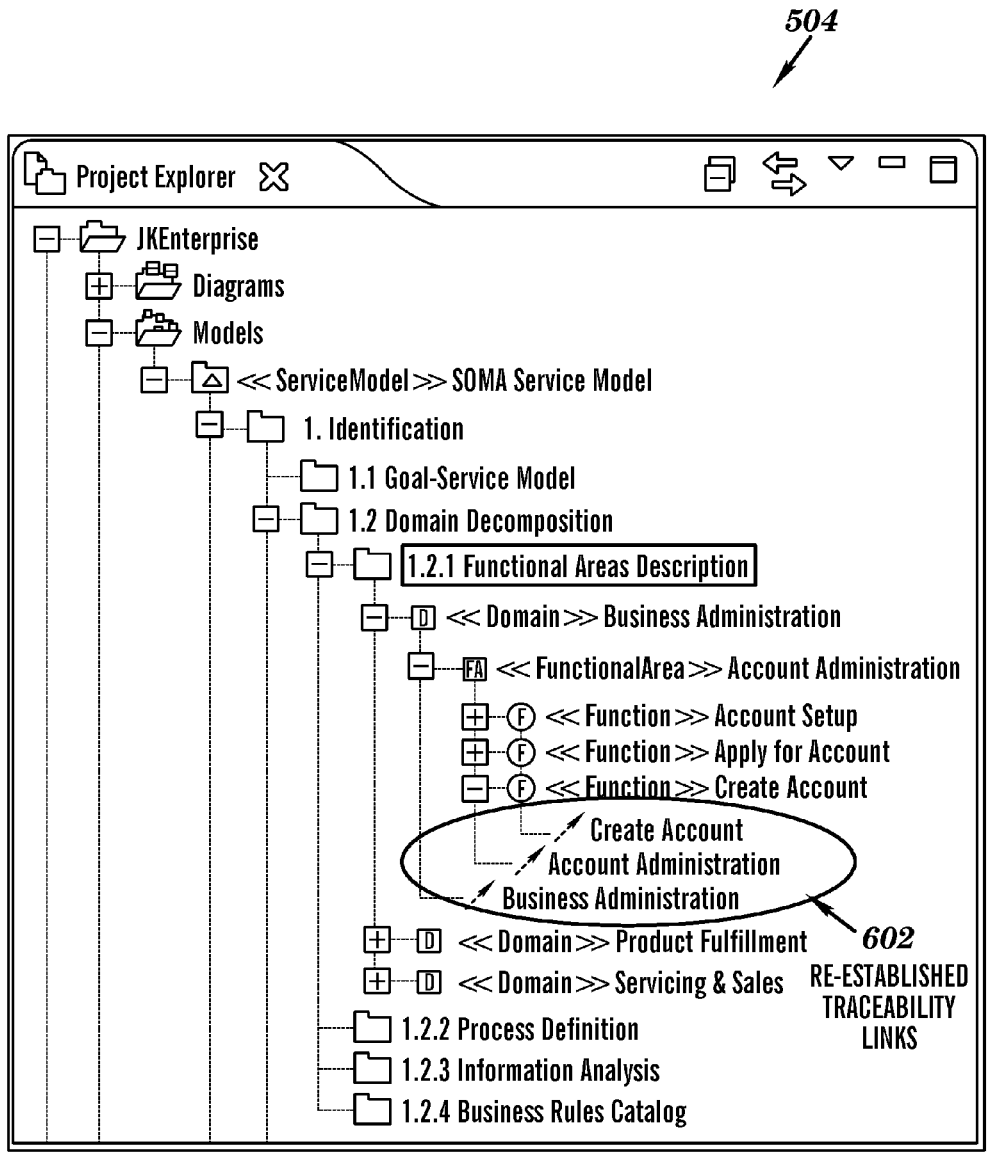
FIG. 6 illustrates the target model of FIG. 5 with re-established traceability links 602, in accordance with embodiments of the present invention.

The following steps illustrate an implementation example for re-establishing traceability links between unified modeling language (UML) models:
1. An architect (i.e. software architect) configures and invokes a model to model transformation. A model to model transformation comprises a process for converting one model to another model of a same system.
   A. A CBM to SOA transformation may be used.
   B. A UML model with a CBM model stereotype is used as source model for the transformation (as illustrated in FIG. 3).
   C. The CBM model comprises the following model elements (as illustrated in FIG. 3).
     a. A business competency—"Business Administration"
     b. A business component—"Accounts Administration"
     c. A business activity—"Account Opening"
   D. A UML Model with a service model stereotype may be used as a target model for the transformation.
2. System 5 generates the following model elements in the target model corresponding to model elements of the source model (as illustrated in FIG. 3).
   A. A domain—"Business Administration"
   B. A functional area—"Accounts Administration"
   C. A function—"Account Opening"
3. The architect enhances the target model (as illustrated in FIG. 4).
4. The source model is lost unexpectedly (as illustrated in FIG. 5) as illustrated by the following examples:
   A. The file is corrupt.
   B. There are version compatibility issues.
   B. File deletion by mistake.
6. The architect realizes that the traceability links between the target and source models are lost (as illustrated in FIG. 5).
7. The architect triggers the algorithm of FIG. 2.
8. System 5 retrieves following model elements from the target model.
   A. A domain—"Business Administration"
   B. A functional area—"Accounts Administration"
   C. A function—"Account Opening"
9. System 5 retrieves following traceability links from the model elements:
   A. Business administration" between business competency (source model) and domain (target model).
   B. "Account Administration" between business component (source model) and functional area (target model).
   C. "Account Opening" between business activity (source model) and function (target model).
10. The system verifies an existence of a supplier for the traceability links: "Business Administration", "Account Administration", and "Account Opening".
   A. Since the source model was re-generated, it will not find the existence of a supplier (i.e., a null value) for these traceability links.
11. Due to non-existence of a supplier, system 5 removes the traceability links.
12. System 5 identifies the following source model elements from a transformation mapping file.
   A. Business competency with a same name of Domain—"Business Administration".
   B. Business component with a same name of functional area—"Accounts Administration".
   C. Business activity with a same name of function—"Account Opening".
13. System 5 creates a traceability link from the model elements of the target model to corresponding model elements of the source model (as illustrated in FIG. 6).

A. "Business Administration" domain to "Business Administration" business competency.
B. "Accounts Administration" functional area to "Accounts Administration" business component.
C. "Account Opening" function to "Account Opening" business activity.

Figure 2:
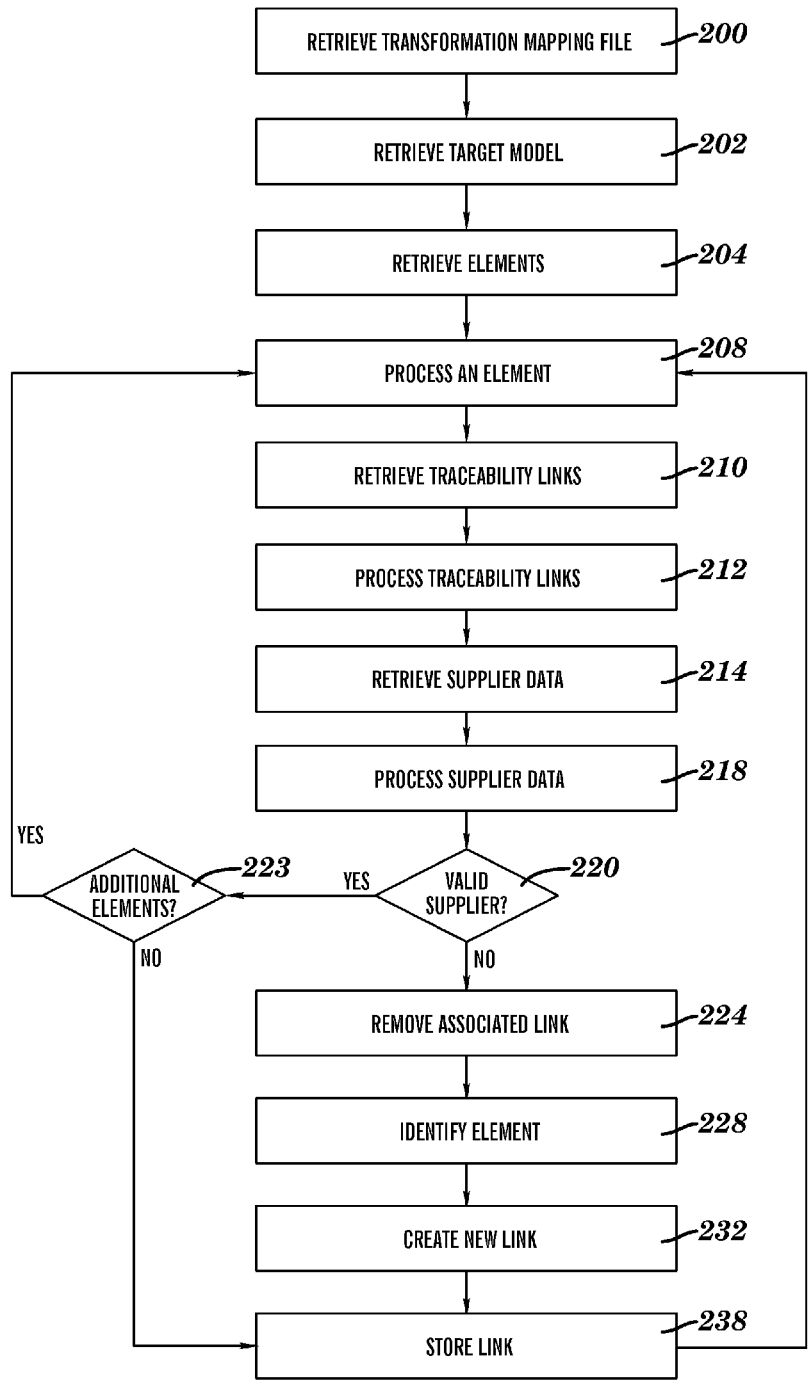
FIG. 2 illustrates a flowchart describing an algorithm used by the system of FIG. 1 for re-establishing traceability links between unified modeling language (UML) models, in accordance with embodiments of the present invention.

FIG. 2 illustrates a flowchart describing an algorithm used by system 5 of FIG. 1 for re-establishing traceability links between unified modeling language (UML) models, in accordance with embodiments of the present invention. In step 200, a computing system (e.g., computing system 5 of FIG. 1) retrieves a transformation mapping file comprising mapping data. The mapping data comprises data associating elements (e.g., elements 305a . . . 305c as described with respect to FIG. 3, infra) of a source model (e.g., service model 302 as described with respect to FIG. 3, infra) to elements (e.g., elements 310a and 310b as described with respect to FIG. 3, infra) of a target model (e.g., target model 304 as described with respect to FIG. 3, infra). In step 202, the computing system retrieves the target model (e.g., from a database). In step 204, the computing system retrieves elements from the target model. In step 208, the computing system processes a first element of the elements. In step 210, the computing system retrieves first traceability links from the first element. The first traceability links are associated with the first element. In step 212, the computing system processes the first traceability links. In step 214, the computing system retrieves first supplier data associated with the first traceability links. The first supplier data comprises data associated with a first supplier. In step 218, processes the first supplier data in order to locate the first supplier. In step 220, the computing system verifies if the first supplier comprises a valid supplier.

If in step 220, the computing system verifies that the first supplier comprises a valid supplier then in step 223, the computing system determines if additional elements require processing. If in step 223, the computing system determines that additional elements require processing then step 208 is repeated for additional elements. If in step 223, the computing system determines that additional elements do not require processing then in step 238 the associated link (i.e., with the first supplier is stored) and the process is terminated.

If in step 220, the computing system verifies that the first supplier does not comprise a valid supplier then in step 224, the computing system removes the first traceability links. In step 228, the computing system identifies a second element of the elements that is associated with a source element of source elements from the source model. The identification process is based on the mapping data. In step 232, the computing system creates a second traceability link between the second element and the source element. In step 238, the second traceability link is stored and step 208 is repeated for additional elements.

FIG. 3 illustrates a source (CBM) model 302 and a target model 304, in accordance with embodiments of the present invention. Source model 302 comprises elements 305a . . . 305c and target model 304 comprises elements 310a and 310b.

FIG. 4 illustrates an enhance target model process 400, in accordance with embodiments of the present invention.

FIG. 5 illustrates a regenerated source (CBM) model 502 and a target model 504, in accordance with embodiments of the present invention. Target model 504 comprises broken traceability links 508.

FIG. 6 illustrates target model 504 of FIG. 5 with re-established traceability links 602, in accordance with embodiments of the present invention.

Figure 7:
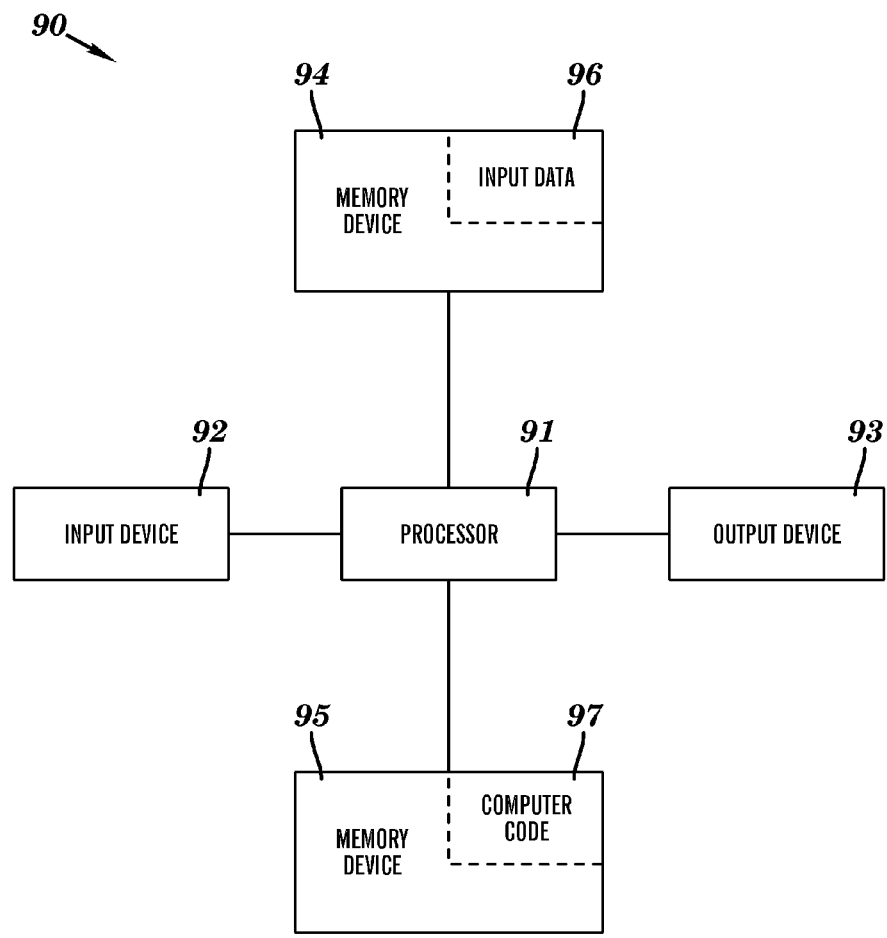
FIG. 7 illustrates a computer apparatus used for re-establishing traceability links between unified modeling language (UML) models, in accordance with embodiments of the present invention.

FIG. 7 illustrates a computer apparatus 90 (e.g., computing system 10 of FIG. 1) used for re-establishing traceability links between unified modeling language (UML) models, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for re-establishing traceability links between unified modeling language (UML) models. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 137may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to re-establish traceability links between unified modeling language (UML) models. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for re-establishing traceability links between unified modeling language (UML) models. In another embodiment, the invention provides a business method that performs the process steps of the invention on a subscription, advertising, and/or fee basis. That is, a service provider, such as a Solution Integrator, could offer to re-establish traceability links between unified modeling language (UML) models. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:

retrieving, by a computing system, a transformation mapping file comprising mapping data, wherein said mapping data comprises data associating elements of a source model to elements of a target model;

retrieving, by said computing system, said target model;

retrieving, by said computing system, first elements of said target model;

processing, by said computing system, a first element of said data associating said elements of said source model to said elements of said target model;

retrieving, by said computing system, first traceability links from said first element, wherein said first traceability links link to said first element;

retrieving, by said computing system, first supplier data associated with a first supplier of said first traceability links;

first verifying, by said computing system, if said first supplier comprises a valid supplier;

storing, by said computing system, results of said first verifying, wherein said results of said first verifying indicates if said first supplier comprises a valid supplier;

determining, by said computing system, that said source model has been lost;

regenerating, by said computing system in response to said determining that said source model has been lost, said source model resulting in a regenerated source model;

identifying, by said computing system, broken traceability links between elements of said regenerated source model and said target model; and restoring, by said computing system, said broken traceability links resulting in re-established traceability links between said regenerated source model and said target model.

2. The method of claim 1, wherein said results of said first verifying indicates that said first supplier comprises a valid supplier, and wherein said method further comprises:

determining, by said computing system, that an additional element of said data associating said elements of said source model to said elements of said target model has not been processed;

processing, by said computing system in response to said determining, a second element of said data associating said elements of said source model to said elements of said target model;

retrieving, by said computing system, second traceability links from said second element, wherein said second traceability links are associated with said second element;

processing, by said computing system, said second traceability links;

retrieving, by said computing system, second supplier data associated with said second traceability links, wherein said second supplier data comprises data associated with a second supplier;

second verifying, by said computing system, if said second supplier comprises a valid supplier; and storing, by said computing system, results of said second verifying, wherein said results of said second verifying indicate if said second supplier comprises a valid supplier.

3. The method of claim 1, wherein said results of said first verifying indicates that said first supplier does not comprise a valid supplier, and wherein said method further comprises:

removing, by said computing system, said first traceability links;

identifying, by said computing system, a second element of said data associating said elements of said source model to said elements of said target model that is associated with a source element of source elements from said source model, wherein said identifying is based on said mapping data;

creating, by said computing system, a second traceability link between said second element of said first elements and said source element; and storing, by said computing system, said second traceability link.

4. The method of claim 1, wherein said results of said first verifying indicates that said first supplier does not exist.

5. The method of claim 1, further comprising:

after said retrieving said transformation mapping file, initializing by said computing system said transformation mapping file.

6. The method of claim 1, wherein said processing comprises retrieving said first element for said retrieving said first traceability links from said first element.

7. The method of claim 1, wherein said transformation mapping file comprises an XML file.

8. A process for supporting computer infrastructure, said process comprising providing at least one support service for at least one of creating, integrating, hosting, maintaining, and deploying computer-readable code in said computing system, wherein the code in combination with said computing system is capable of performing the method of claim 1.

9. A computing system comprising a processor coupled to a computer-readable memory unit, said memory unit comprising instructions that when executed by the processor implements a traceability link re-establishing method, said method comprising:

retrieving, by said computing system, a transformation mapping file comprising mapping data, wherein said mapping data comprises data associating elements of a source model to elements of a target model;

retrieving, by said computing system, said target model;

retrieving, by said computing system, first elements of said target model;

processing, by said computing system, a first element of said data associating said elements of said source model to said elements of said target model;

retrieving, by said computing system, first traceability links from said first element, wherein said first traceability links link to said first element;

retrieving, by said computing system, first supplier data associated with a first supplier of said first traceability links;

first verifying, by said computing system, if said first supplier comprises a valid supplier;

storing, by said computing system, results of said first verifying, wherein said results of said first verifying indicates if said first supplier comprises a valid supplier;

determining, by said computing system, that said source model has been lost;

regenerating, by said computing system in response to said determining that said source model has been lost, said source model resulting in a regenerated source model;

identifying, by said computing system, broken traceability links between elements of said regenerated source model and said target model; and restoring, by said computing system, said broken traceability links resulting in re-established traceability links between said regenerated source model and said target model.

10. The computing system of claim 9, wherein said results of said first verifying indicates that said first supplier comprises a valid supplier, and wherein said method further comprises:
   determining, by said computing system, that an additional element of said data associating said elements of said source model to said elements of said target model has not been processed;
   processing, by said computing system in response to said determining, a second element of said data associating said elements of said source model to said elements of said target model;
   retrieving, by said computing system, second traceability links from said second element, wherein said second traceability links are associated with said second element;
   processing, by said computing system, said second traceability links;
   retrieving, by said computing system, second supplier data associated with said second traceability links, wherein said second supplier data comprises data associated with a second supplier;
   second verifying, by said computing system, if said second supplier comprises a valid supplier; and
   storing, by said computing system, results of said second verifying, wherein said results of said second verifying indicate if said second supplier comprises a valid supplier.

11. The computing system of claim 9, wherein said results of said first verifying indicates that said first supplier does not comprise a valid supplier, and wherein said method further comprises:
   removing, by said computing system, said first traceability links;
   identifying, by said computing system, a second element of said data associating said elements of said source model to said elements of said target model that is associated with a source element of source elements from said source model, wherein said identifying is based on said mapping data;
   creating, by said computing system, a second traceability link between said second element of said first elements and said source element; and
   storing, by said computing system, said second traceability link.

12. The computing system of claim 9, wherein said results of said first verifying indicates that said first supplier does not exist.

13. The computing system of claim 9, wherein said method further comprises:
   after said retrieving said transformation mapping file, initializing by said computing system said transformation mapping file.

14. The computing system of claim 9, wherein said processing comprises retrieving said first element for said retrieving said first traceability links from said first element.

15. A computer program product, comprising a computer readable storage device storing a computer readable program code, said computer readable program code adapted to implement a traceability link re-establishing method within a computing system comprising a computer-readable memory unit, said method comprising:
   retrieving, by said computing system, a transformation mapping file comprising mapping data, wherein said mapping data comprises data associating elements of a source model to elements of a target model;
   retrieving, by said computing system, said target model;
   retrieving, by said computing system, first elements of said target model;
   processing, by said computing system, a first element of said data associating said elements of said source model to said elements of said target model;
   retrieving, by said computing system, first traceability links from said first element, wherein said first traceability links link to said first element;
   retrieving, by said computing system, first supplier data associated with a first supplier of said first traceability links;
   first verifying, by said computing system, if said first supplier comprises a valid supplier;
   storing, by said computing system, results of said first verifying, wherein said results of said first verifying indicates if said first supplier comprises a valid supplier;
   determining, by said computing system, that said source model has been lost;
   regenerating, by said computing system in response to said determining that said source model has been lost, said source model resulting in a regenerated source model;
   identifying, by said computing system, broken traceability links between elements of said regenerated source model and said target model; and
   restoring, by said computing system, said broken traceability links resulting in re-established traceability links between said regenerated source model and said target model.

16. The computer program product of claim 15, wherein said results of said first verifying indicates that said first supplier comprises a valid supplier, and wherein said method further comprises:
   determining, by said computing system, that an additional element of said data associating said elements of said source model to said elements of said target model has not been processed;
   processing, by said computing system in response to said determining, a second element of said data associating said elements of said source model to said elements of said target model;
   retrieving, by said computing system, second traceability links from said second element, wherein said second traceability links are associated with said second element;
   processing, by said computing system, said second traceability links;
   retrieving, by said computing system, second supplier data associated with said second traceability links, wherein said second supplier data comprises data associated with a second supplier;
   second verifying, by said computing system, if said second supplier comprises a valid supplier; and
   storing, by said computing system, results of said second verifying, wherein said results of said second verifying indicate if said second supplier comprises a valid supplier.

17. The computer program product of claim 15, wherein said results of said first verifying indicates that said first supplier does not comprise a valid supplier, and wherein said method further comprises:
   removing, by said computing system, said first traceability links;

identifying, by said computing system, a second element of said data associating said elements of said source model to said elements of said target model that is associated with a source element of source elements from said source model, wherein said identifying is based on said mapping data;

creating, by said computing system, a second traceability link between said second element of said first elements and said source element; and storing, by said computing system, said second traceability link.

18. The computer program product of claim 15, wherein said results of said first verifying indicates that said first supplier does not exist.

19. The computer program product of claim 15, wherein said method further comprises:

after said retrieving said transformation mapping file, initializing by said computing system said transformation mapping file.

20. The computer program product of claim 15, wherein said processing comprises retrieving said first element for said retrieving said first traceability links from said first element.

* * * * *